United States Patent
Häußler et al.

(10) Patent No.: US 11,951,886 B2
(45) Date of Patent: Apr. 9, 2024

(54) VEHICLE-MOUNTABLE CHILD SAFETY SEAT ASSEMBLY

(71) Applicant: Britax Römer Kindersicherheit GmbH, Leipheim (DE)

(72) Inventors: Bernd Häußler, Ulm (DE); Nabil Kzaiz, Günzburg (DE); Marcel Brenner, Leipheim (DE)

(73) Assignee: BRITAX RÖMER KINDERSICHERHEIT GMBH, Leipheim (DE)

( * ) Notice: Subject to any disclaimer, the term of this patent is extended or adjusted under 35 U.S.C. 154(b) by 200 days.

(21) Appl. No.: 17/678,468

(22) Filed: Feb. 23, 2022

(65) Prior Publication Data

US 2022/0281364 A1    Sep. 8, 2022

(30) Foreign Application Priority Data

Mar. 3, 2021    (AU) ................. 2021201385

(51) Int. Cl.
*B60N 2/28* (2006.01)
*B60Q 9/00* (2006.01)

(52) U.S. Cl.
CPC ............. *B60N 2/2842* (2013.01); *B60Q 9/00* (2013.01)

(58) Field of Classification Search
CPC ......... B60N 2/268; B60N 2/2842; B60Q 9/00
See application file for complete search history.

(56) References Cited

U.S. PATENT DOCUMENTS

| 9,221,368 | B2 | 12/2015 | Hou et al. | |
| 10,730,412 | B2 * | 8/2020 | Pos ..................... | B60N 2/2824 |
| 10,737,594 | B2 * | 8/2020 | Böhm .................. | B60N 2/2827 |
| 2003/0160689 | A1 | 8/2003 | Yazdgerdi | |
| 2006/0208911 | A1 | 9/2006 | Davis | |

(Continued)

FOREIGN PATENT DOCUMENTS

| CN | 101786431 A | 7/2010 |
| CN | 203267824 U | 11/2013 |

(Continued)

OTHER PUBLICATIONS

Australian Examination Report No. 1 for AU Patent Application No. 2021201385, dated Apr. 6, 2021.

(Continued)

*Primary Examiner* — Philip F Gabler
(74) *Attorney, Agent, or Firm* — K&L Gates LLP

(57) ABSTRACT

A vehicle-mountable child safety seat assembly is disclosed. The seat assembly includes a safety seat and a prop assembly mounted with respect to the safety seat. The prop assembly has a stowed position and a safely deployed position. The prop assembly includes: a leg assembly; a foot assembly mounted to the leg assembly; and a first sensor, for example a tilt sensor, for sensing when the prop assembly is not in the stowed position. A second sensor for sensing when the prop assembly is not in the safely deployed position is also provided. A warning system is also disclosed. The warning system changes from a timing state to the warning state if the second sensor senses that the prop assembly is not in its safely deployed position by a pre-determined time after the change from a standby state to a timing state.

20 Claims, 9 Drawing Sheets

(56) References Cited

U.S. PATENT DOCUMENTS

| | | | | |
|---|---|---|---|---|
| 2008/0224516 A1* | 9/2008 | Vegt | ............... | B60N 2/2887 |
| | | | | 297/256.16 |
| 2009/0184549 A1* | 7/2009 | Kassai | ............ | B60N 2/2878 |
| | | | | 297/216.11 |
| 2013/0307300 A1* | 11/2013 | Pos | ............... | B60N 2/2884 |
| | | | | 297/216.12 |
| 2019/0031052 A1 | 1/2019 | Pos | | |

FOREIGN PATENT DOCUMENTS

| | | |
|---|---|---|
| CN | 108136941 A | 6/2018 |
| CN | 208248019 U | 12/2018 |
| CN | 211107060 U | 7/2020 |
| DE | 202013103189 U1 | 11/2013 |
| DE | 202015104792 U1 | 12/2015 |
| EP | 2210769 A2 | 7/2010 |
| EP | 2979920 B1 | 3/2017 |
| EP | 3347234 B1 | 11/2020 |
| JP | 2018-526282 A | 9/2018 |
| KR | 10-2018-0067508 A | 6/2018 |
| WO | 2017/042330 A1 | 3/2017 |
| WO | 2019/019502 A1 | 1/2019 |
| WO | 2019/148984 A1 | 8/2019 |
| WO | 2020/110553 A1 | 6/2020 |

OTHER PUBLICATIONS

IPRP and Written Opinion of the International Searching Authority for International Patent Application No. PCT/JP2019/042201, dated May 25, 2021.

Australian Examination Report No. 2 for AU Patent Application No. 2021201385, dated Dec. 9, 2021.

* cited by examiner

VEHICLE-MOUNTABLE CHILD SAFETY SEAT ASSEMBLY

PRIORITY CLAIM

The present application claims priority to AU Patent Application No. 2021201385, filed Mar. 3, 2021, the entirety of which is herein incorporated by reference and relied upon.

TECHNICAL FIELD

The present disclosure relates to a vehicle-mountable child safety seat assembly.

BACKGROUND

Child safety seat assemblies, or child safety seats, are secured inside a vehicle to protect children in vehicles from the effects of accidents, sudden deceleration, or other impacts or jarring events. A typical child safety seat assembly may include various protective features relating to securing the child safety seats in the vehicle, securing the child to the child safety seat, and protecting the child once the child is secured in the child safety seat.

A prop assembly, for example a support leg, may be provided as part of a safety seat assembly to prevent, limit or reduce movement or rotation of the child seat assembly in the event of an impact or crash and in particular improve the stability of the child safety seat assembly in a frontal impact. Such a prop assembly may be disposed on an end of a base of the safety seat assembly and may be mounted to the base for instance. Alternatively, it may be mounted to the back of a safety seat that is secured to a base, or is directly secured to the vehicle. The prop assembly may have a stowed or folded condition and an unfolded condition for deployment. Some prop assemblies may have an adjustable length to suit different vehicles and in particular different geometries of vehicle seats and vehicle floors or their foot wells. It is important that a prop assembly with a floor engaging portion properly engages with the vehicle floor so that it can function correctly, particularly in the event of an impact or a crash.

It is against this background that the present disclosure has been developed.

SUMMARY

According to a first aspect, there is provided a vehicle-mountable child safety seat assembly, the seat assembly including a safety seat, and a prop assembly mounted with respect to the safety seat, the prop assembly having a stowed position and a safely deployed position, the prop assembly including:
  a leg assembly;
  a foot assembly mounted to the leg assembly; and
  a first sensor for sensing when the prop assembly is not in the stowed position;
  a second sensor for sensing when the prop assembly is not in the safely deployed position;
  a visual warning indicator, the visual warning indicator visually obscured when the prop assembly is in the safely deployed position; and
  a warning system having a standby state, a timing state and a warning state,
  wherein the warning system changes from the standby state to the timing state when the first sensor senses that the prop assembly is not in its stowed position, and
  wherein the warning system changes from the timing state to the warning state, if the second sensor senses that the prop assembly is not in its safely deployed position by a pre-determined time after the change from the standby state to the timing state.

In one form, the assembly includes a base for receiving the safety seat.

In one form, the prop assembly is pivotably mounted to the base.

In an alternative form, the prop assembly is pivotably mounted to the safety seat.

In one form, the warning system includes a processor and a sound generator for generating an audible alarm sound, and
  wherein when the warning system changes from the timing state to the warning state, the sound generator is activated so as to generate an audible alarm sound.

In one form, the foot assembly includes a foot housing mounted to the leg assembly and a foot body moveably mounted with respect to the foot housing, the foot body having an extended position and a retracted position.

In one form, the visual warning indicator is visually exposed when the foot body is in the extended position, thereby indicating that the prop assembly is not in the safely deployed position.

In one form, wherein the foot body is slideably mounted with respect to the foot housing.

In one form, the visual warning indicator is located on a lower end of the leg assembly and the foot body includes a sleeve, the sleeve covering the visual warning indicator in its retracted position and exposing the visual warning indicator in its extended position.

In one form, the foot body is biased toward its extended position.

In one form, the foot body is biased toward its extended position by a pair of spaced apart compression springs.

In one form, the foot body includes a foot base, the foot base arranged and constructed for engaging a vehicle floor.

In one form, the first sensor is a tilt sensor mounted to the prop assembly.

In one form, the tilt sensor is mounted in the foot housing.

In one form, the tilt sensor senses the angle of the leg assembly with respect to vertical.

In another form, the tilt sensor has a first switch condition and a second switch condition, the second switch condition activating when the tilt sensor senses that the angle of the leg assembly with respect to horizontal exceeds a pre-defined tilt angle.

In one form, the tilt sensor has a first switch condition and a second switch condition, the second switch condition activating when the tilt sensor senses that leg assembly has moved away from the stowed position.

In one form, the second sensor is a displacement sensor.

In one form, the second sensor is mounted in the foot housing and is activated by movement of the foot body.

In one form, the leg assembly includes:
  an upper leg portion;
  a lower leg portion, the lower leg portion telescopically moveable with respect to the upper leg portion; and
  a locking mechanism for locking the lower leg with respect to the upper leg portion at a plurality of user-selectable extension positions.

BRIEF DESCRIPTION OF DRAWINGS

Embodiments of the present invention will be discussed with reference to the accompanying drawings wherein.

DESCRIPTION OF EMBODIMENTS

Figure 1A:
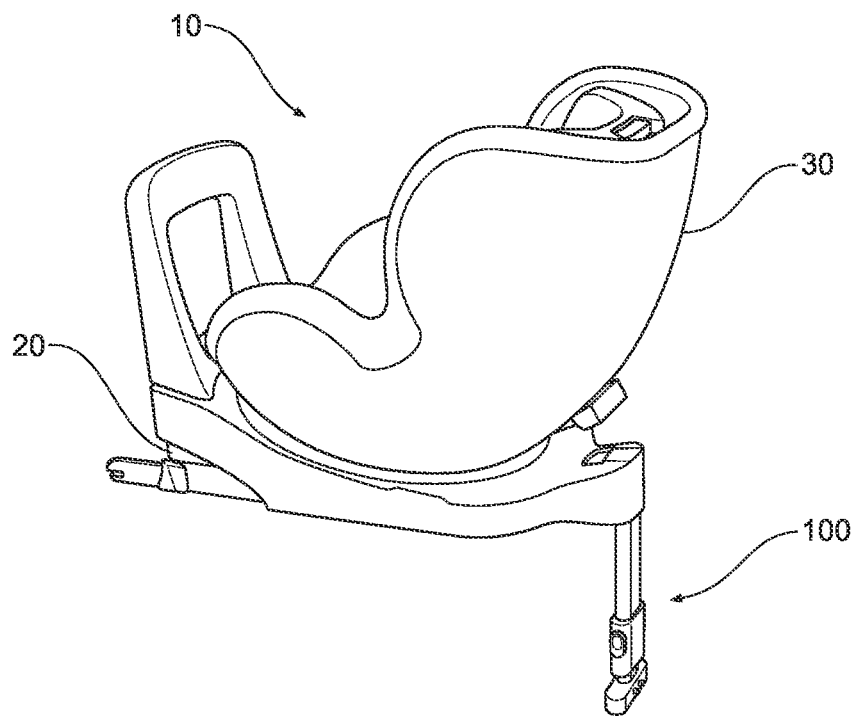
FIG. 1A is a perspective view of a vehicle-mountable child safety seat assembly according to an embodiment of the disclosure.
Figure 1B:
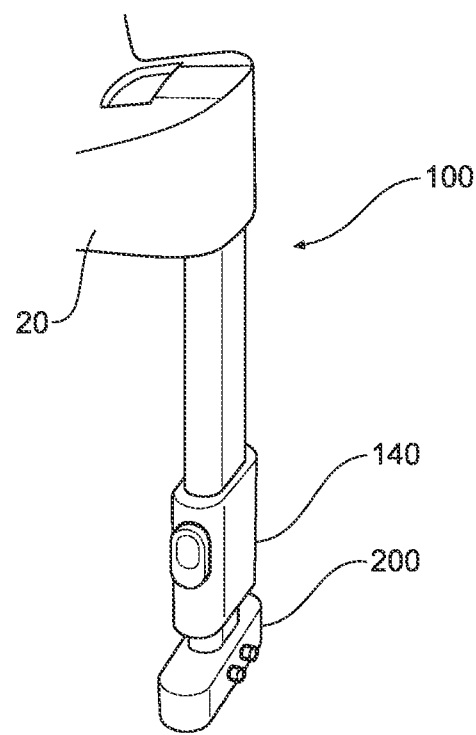
FIG. 1B is a close-up view showing a portion of the assembly of FIG. 1A, including a prop assembly.
Figure 4:
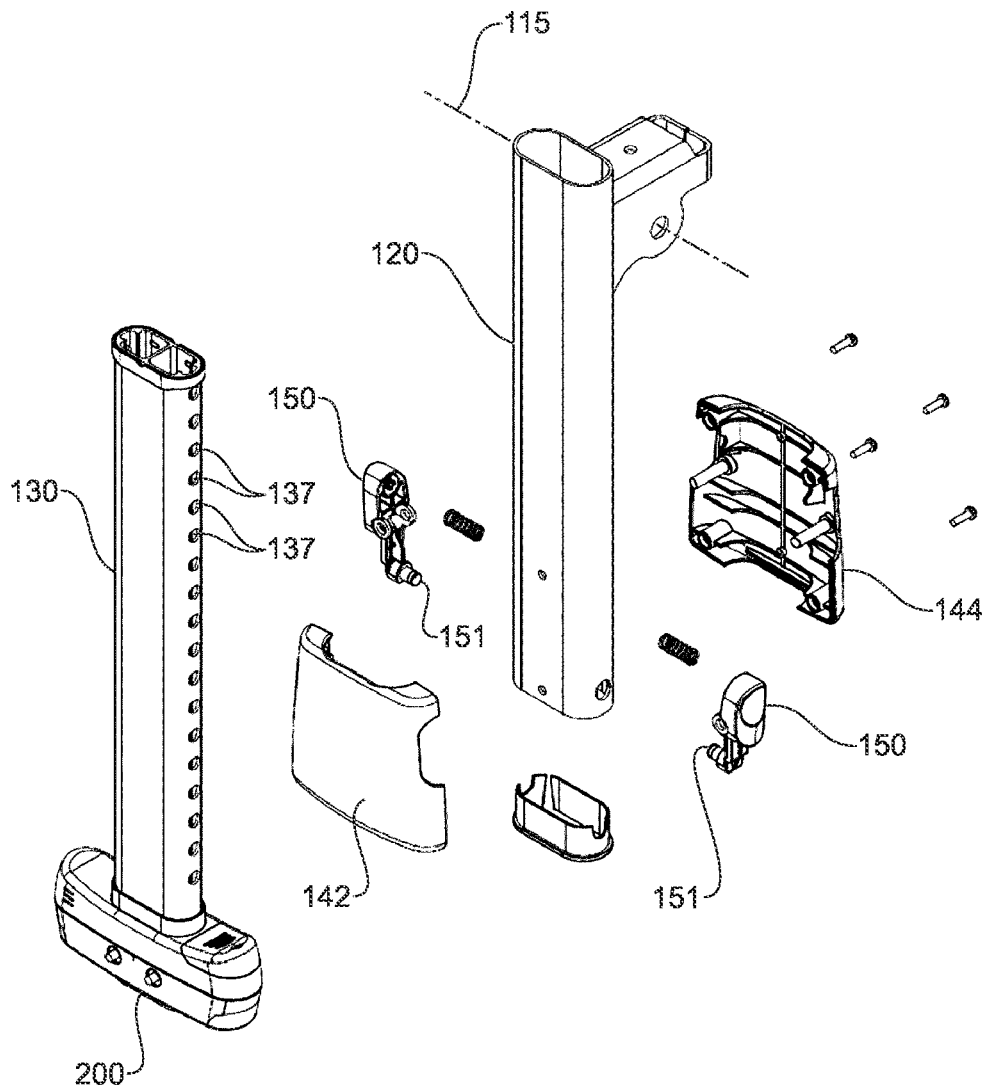
FIG. 4 is an exploded view of the prop assembly of FIGS. 1A and 1B.

Referring to FIGS. 1A and 1B, a vehicle mountable child safety seat assembly 10 is shown. The seat assembly 10 includes a base 20 for receiving a safety seat 30 and a prop assembly 100. The prop assembly 100 is mounted to the base 20. For example, the prop assembly 100 may be pivotally mounted to the base 20 around an axis 115 as shown in FIG. 4. In alternative embodiments of the invention, the prop assembly may be mounted to the back of a safety seat. In some embodiments, the vehicle mountable child safety seat assembly may be configured to be secured directly to the vehicle (in an assembly without a separate base for example).

Figure 2A:
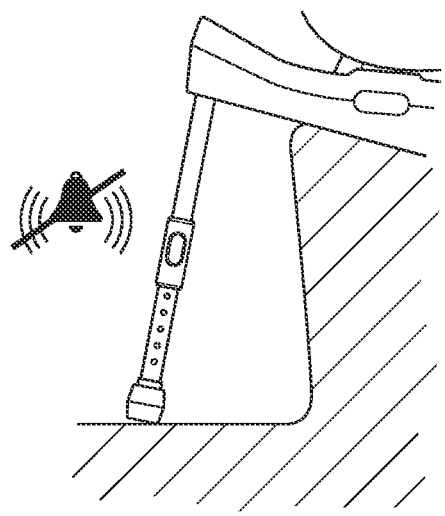
FIGS. 2A and 2B are diagrammatic side views of the assembly of FIGS. 1A and 1B showing the prop assembly in a partially deployed position and a safely deployed condition.
Figure 2B:
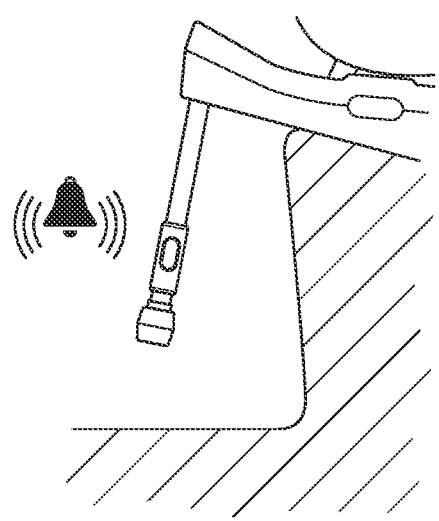
Figure 3A:
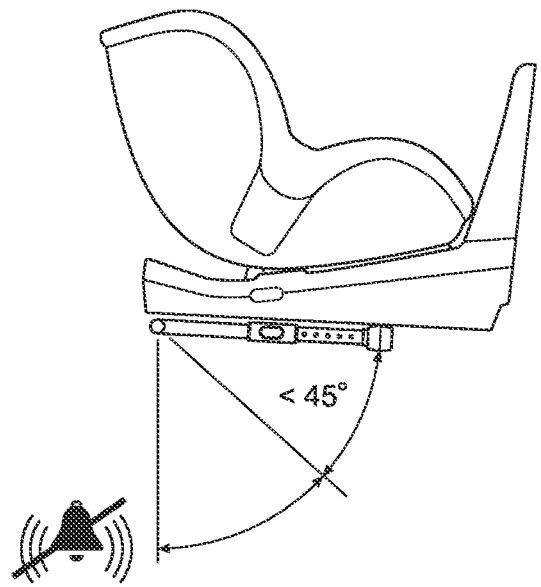
FIGS. 3A and 3B are diagrammatic side views of the assembly of FIGS. 1A and 1B showing the prop assembly in a stowed position and a partially deployed and alarmed condition.

The prop assembly 100 shown in FIG. 3A has a stowed position and a safely deployed position which is shown in FIG. 2A. In the safely deployed position, the prop assembly 100 engages a vehicle's floor so as to resist and limit forward rotation of the child safety seat assembly 10.

The prop assembly 100 includes a leg assembly 110 pivotably mounted to the base 20, around an axis 115 as is most clearly shown in FIGS. 1B, 3A, 3B and 4. A foot assembly 200 is mounted to the leg assembly 110 at a lower end 190 thereof. A visual warning indicator 300, in the form of a red coloured area is provided. This is most clearly shown in FIGS. 7 and 8A. The visual warning indicator 300 is visually obscured when the prop assembly 100 is in the safely deployed position as shown in FIGS. 2A and 8B. That is, when the prop assembly 100 is properly installed, the visual warning indicator 300 is no longer visible. In other embodiments, a visual indicator (or indicators) may be placed in alternative locations, for example, but not limited to, a hinge region towards or at the top the prop assembly.

A first sensor 310 for sensing when the prop assembly 100 is not in the stowed position is provided. In the embodiment illustrated, this first sensor 310 is a tilt sensor mounted to the prop assembly 100 as is most clearly shown in FIGS. 8A and 8B.

While in the embodiment illustrated, the first sensor 310 is in the form of a tilt sensor 310, in alternative embodiments, different types of sensors could be employed, such as displacement sensors, mechanical switch(es), angle sensors or proximity sensors, including optical or photo-optical sensors. Any sensor that is capable of distinguishing between a stowed and non-stowed position may be used.

The tilt sensor of the embodiment illustrated senses the angle of the leg assembly with respect to vertical. It therefore does not precisely measure the angle of the leg assembly with respect to the base 20. However, in practice, it provides a good indicator suitable for the warning or alarming function of the embodiments of this disclosure. Some of the other sensor types mentioned in the above paragraph may be advantageously employed in some applications.

In other embodiments of the invention, rather than employing a tilt sensor, an alternative sensor type may be provided that is able to directly detect relative displacement, such as angular displacement or linear displacement of the prop assembly away from its stowed position. For example, such a sensor may trigger or switch at 5 degrees of relative angular displacement of the prop assembly away from its stowed position.

The first sensor 310 is shown and described mounted to the prop assembly 100, however, it may also be placed at other positions including within or adjacent the locking mechanism 140 shown in FIGS. 1B and 4, in or on a tube of the upper or lower leg 120, 130.

Figure 3B:
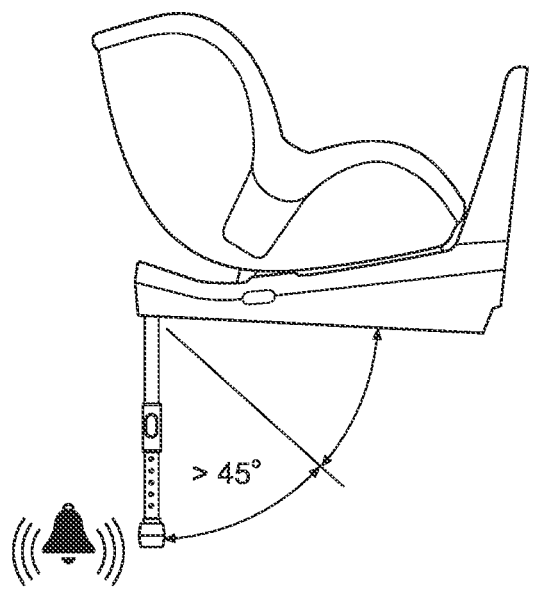

The tilt sensor 310 shown in the drawings has a first switch condition and a second switch condition. The second switch condition activates when the tilt sensor senses that the angle of the leg assembly with respect to horizontal is greater than a pre-defined angle. The pre-defined angle for the embodiment illustrated in FIGS. 3A and 3B is 45 degrees. In other embodiments, the pre-defined angle could be 5, 25 or 65 degrees for instance. Other pre-defined trigger angles could also be used.

A second sensor 320 for sensing when the prop assembly 100 is not in the safely deployed position is also provided. This second sensor 320 is again shown in FIGS. 8A and 8B. In the embodiment illustrated, the second sensor is a mechanical switch.

A warning system 400 in the form of an alarm system 400 including a processor and a sound generator 420 for generating an audible alarm sound is also provided. The warning system has a standby state, a timing state and a warning (or an alarming) state. The warning system changes from the standby state to the timing state when the first sensor senses that the prop assembly 100 is not in the stowed position. This transition from a stowed position to not in a stowed position is illustrated in the movement from the position shown in FIG. 3A to the position showing in FIG. 3B.

The warning system changes from the timing state to the alarming state, activating the sound generator, if the second sensor senses that the prop assembly 100 is not in its safely deployed position by a pre-determined time after the change from the standby state to the timing state. The pre-determined time may be programed to be between 2 and 30 seconds for example. Five seconds is used for the illustrated embodiment, but this time may be shorter or longer in different embodiments. The purpose of the time delay is to allow the user (the person installing the safety seat assembly 10) sufficient time to correctly deploy the prop assembly 100 to its safely deployed position before an alarm sounds.

Conversely, should the user not achieve a safe deployment after a reasonable time, then it is desirable to have an audible warning without excessive delay. It is against this background that an optimal range of delay time is selected (between 2 and 30 seconds, for example 5 seconds).

Referring to FIGS. 6, 7, 8A and 8B, it can be seen that the foot assembly includes a foot housing 210 mounted to the leg assembly 110 and a foot body 250 moveable mounted with respect to the foot housing 210, the foot body 250 having an extended position (shown in FIG. 8A) and a retracted position (shown in FIG. 8B).

Figure 7:
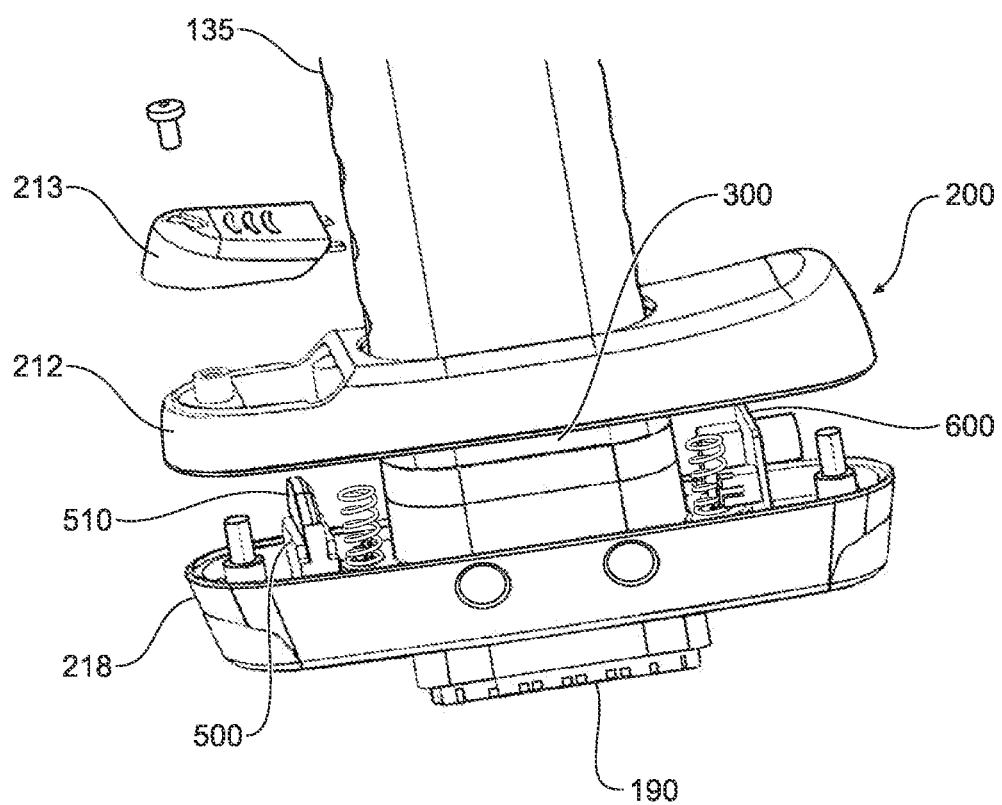
FIG. 7 is a close-up perspective view of the foot assembly of FIG. 6 in a partially exploded view.
Figure 8:
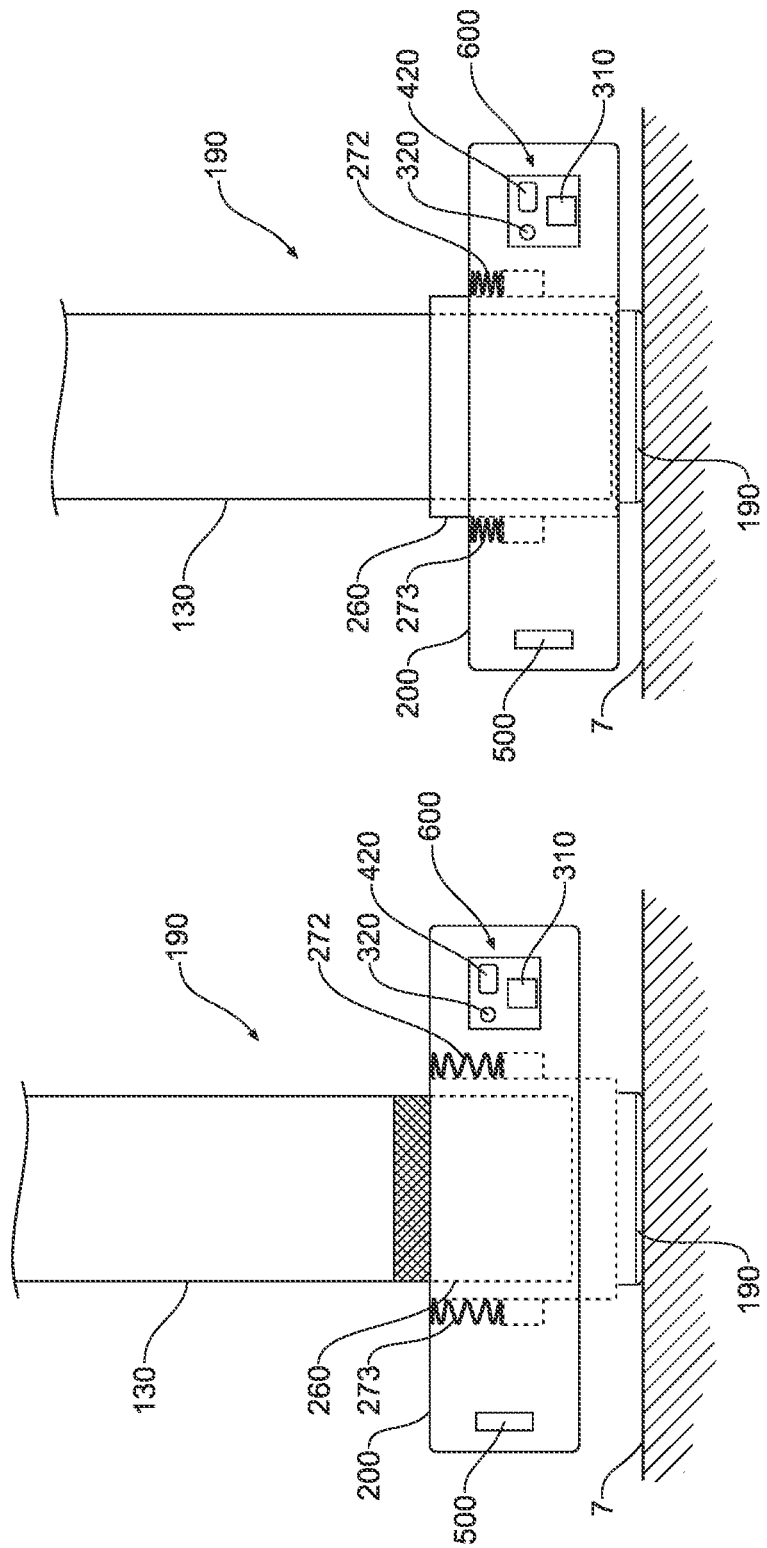
FIG. 8A is a diagrammatic side view of the lower leg end of the assembly shown in FIG. 7 with a foot body in an extended position.
FIG. 8B is a diagrammatic side view of the lower leg end of the assembly shown in FIG. 7 with a foot body in an retracted position.
Figure 9:
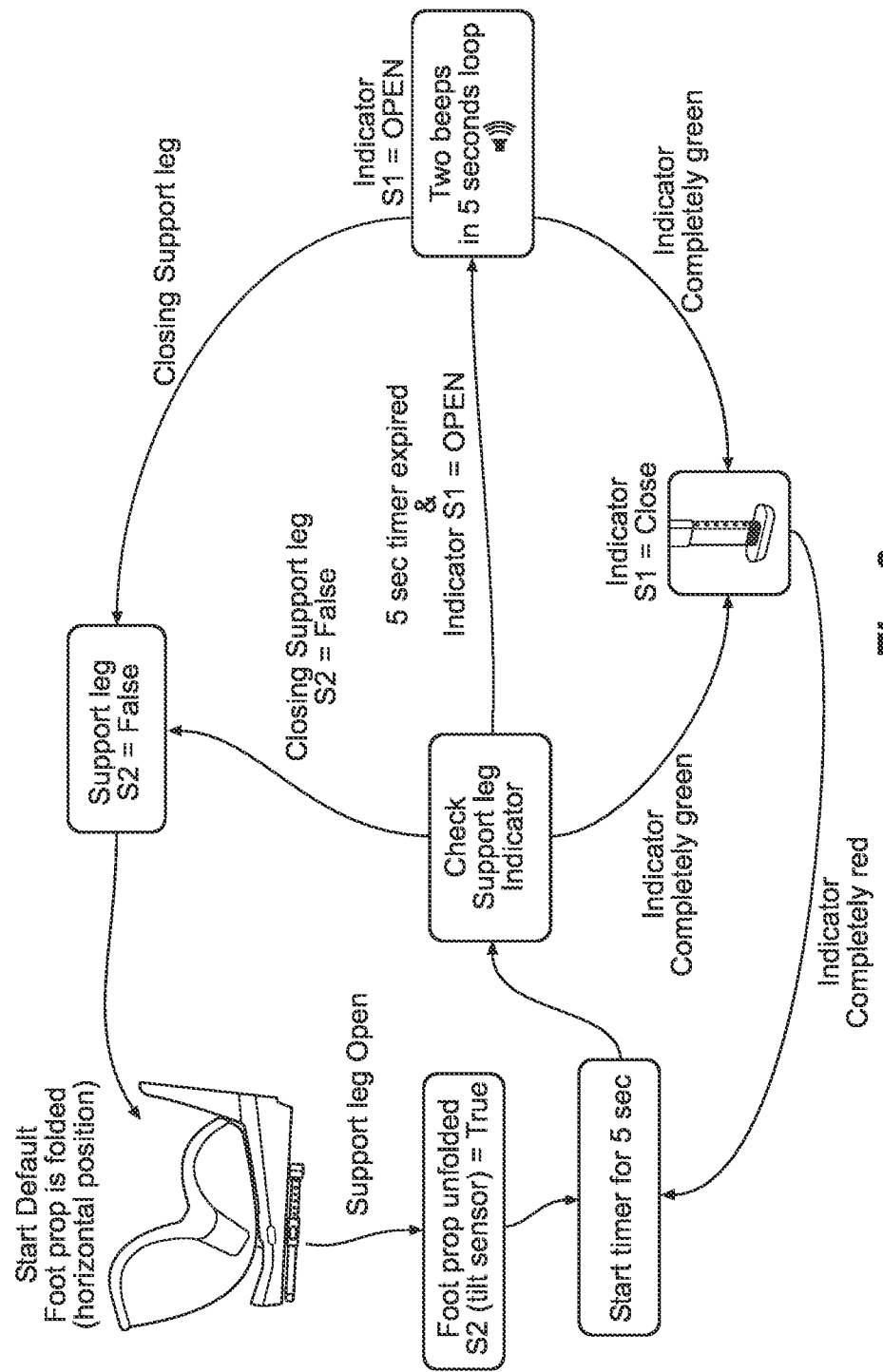
FIG. 9 is a flow diagram which diagrammatically illustrates how the child safety seat assembly of the invention functions.

Referring to FIGS. 7 and 8A, it can be seen that the visual warning indicator 300 is visually exposed when the foot body is in the extended position, thereby indicating that the prop assembly 100 is not in the safely deployed position shown in FIG. 8B.

The foot body 250 is slideably mounted with respect to the foot housing 210. This sliding movement facilitates the functioning of the visual indicator. The warning indicator is located on a lower end 190 of the leg assembly 110 and the foot body 250 includes a sleeve 260, the sleeve covering the warning indicator in its retracted position and exposing the warning indicator in its extended position.

The foot body 250 is biased toward its extended position. While various biasing means may be used, in the present embodiment, the foot body 250 is biased toward its extended position by a pair of spaced apart compression springs 272, 273.

The foot body includes a foot base 290, and the foot base is arranged and constructed for engaging a vehicle floor 7 as shown in FIGS. 8A and 8B.

Further detail of the foot assembly 200 is shown in FIGS. 6 and 7, 8A and 8B. Collectively these figures show that the foot assembly 200 has a foot housing upper 212 and foot housing lower 218, an electronics module 600 that includes the first sensor in the form of a tilt sensor 310, the second sensor in the form of a switch 310 and a sound generator 420 (for example a buzzer, horn or speaker). A battery holder 500 holding a battery 510 is also shown under a battery cover 213 visible in FIGS. 6 and 7.

Figure 5:
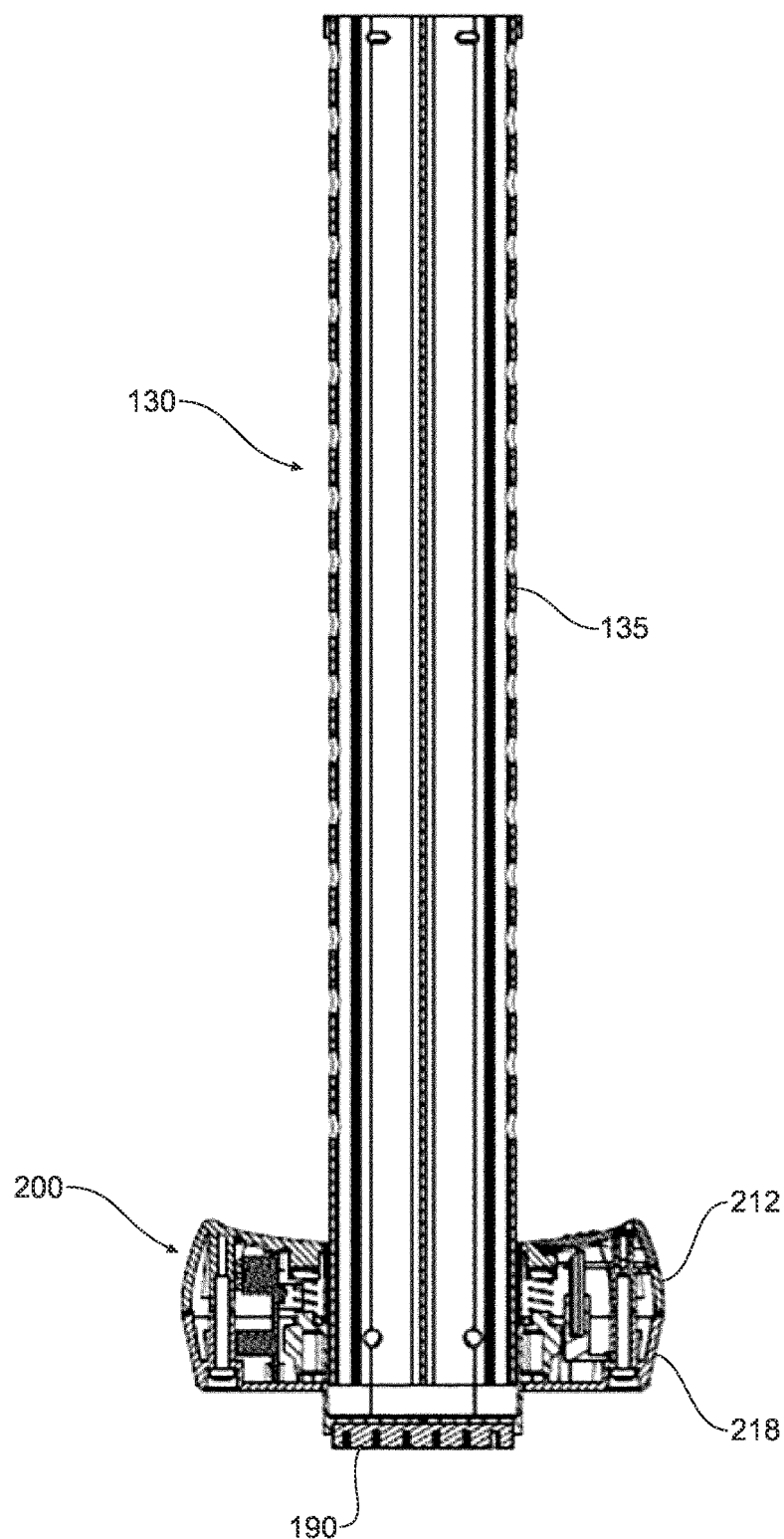
FIG. 5 is a cross-sectional view of a lower leg portion of a leg assembly shown in FIG. 4.
Figure 6:
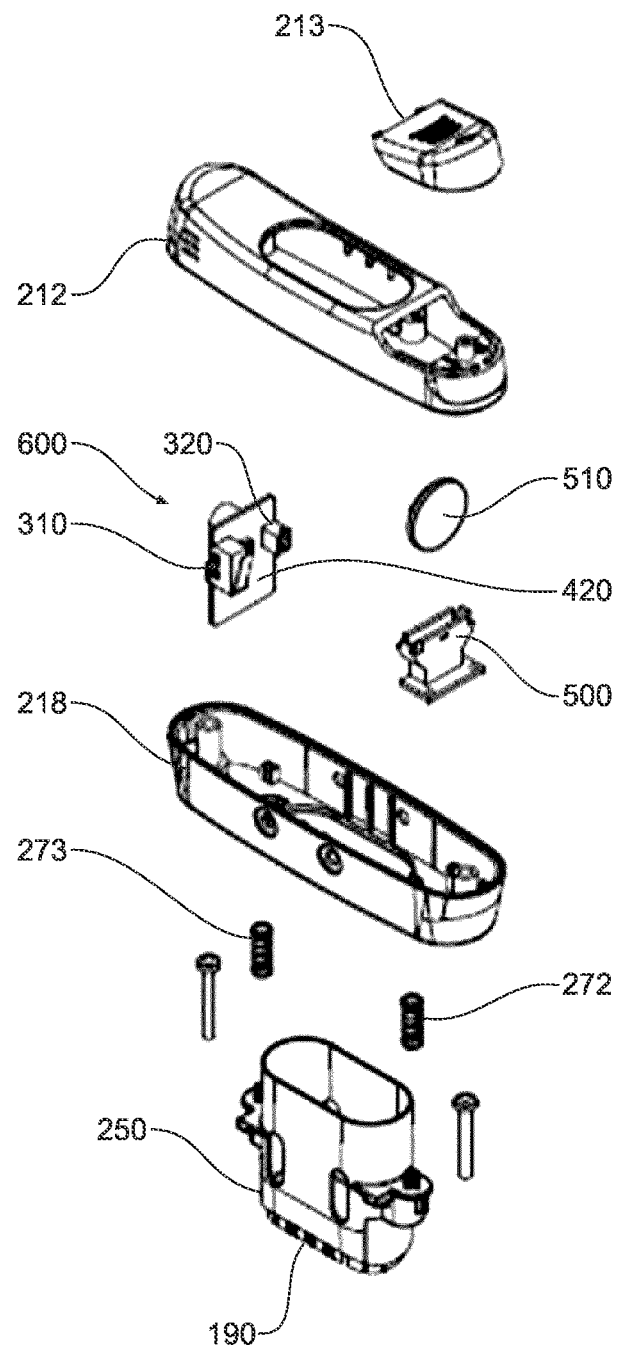
FIG. 6 is an exploded view of a foot assembly shown in FIG. 5.

Referring to FIGS. 4 and 5, it can be seen that the leg assembly includes: an upper leg portion 120 and a lower leg portion 130, the lower leg portion being telescopically moveable with respect to the upper leg portion. A locking mechanism 140 for locking the lower leg with respect to the upper leg portion at a plurality of user-selectable extension positions is also provided. Buttons 150 pivot to release or engage protrusions 151 within holes 137 within the lower leg tube 135 to allow the user to extend or retract and then lock the lower leg portion 130 with respect to the upper leg portion 120 depending on the distance down to the vehicle floor. The buttons 150 are biased outwards by coil springs 148 and the protrusions 151 are biased inwards.

Using the prop assembly, including the locking mechanism 140 described above and shown in FIG. 4, the user can adjust the length of the leg assembly 110 ensure that there is sufficient pressure on the foot base 290 to compress the springs 272 and 273 into the position shown in FIG. 8B in which the visual warning indicator is hidden and in which the alarm will be silenced (or won't alarm if the operation is completed before the time out of the timer).

Referring again to the exploded view of FIG. 4, it can be seen that the leg assembly 110 includes locking mechanism cover halves 142, 144.

In the embodiment illustrated the warning indicator is coloured red. In other embodiments other colours, or patterns of colours may be used.

Referring again to the second sensor, while a mechanical switch is used in the embodiment illustrated, in other embodiments, proximity sensors, including optical or photo-optical sensors may be provided. Any sensor that is capable of distinguishing between a retracted and an extended position may be used.

In further embodiments of the invention, the warning state of the warning system 400 may be arranged to be triggered as soon as the support leg of the prop assembly is tilted more than 5° and then only stops when the correct installation angle is reached. With this embodiment a second sensor, such as the second sensor 320 may be omitted.

While the warning system 400 shown in the embodiments illustrated includes an audible alarm (for instance in the form of a buzzer, horn, speaker or other sound generating device), in further embodiments of the invention the warning system 400 may produce a warning signal that is transmissible through a wired or wireless connection to another device or system. For example, the warning system 400 may communicate to or with a mobile phone, tablet, watch or other personal device or may communicate to or with a vehicle computer system. Such another devices or systems may then produce warning of any suitable type including but not limited to sounds, pre-recorded messages, vibrations, visual messages or symbols. Visual messages or symbols may be displayed on one or more of a vehicle's screens for example. Furthermore, interfaces may be provided with a vehicle control unit that may prevent the vehicle moving or exceeding a pre-defined speed in the event of a warning signal (or lack of a 'safe' signal linked reciprocally to the warning signal).

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A vehicle-mountable child safety seat assembly, the seat assembly including a safety seat, and a prop assembly mounted with respect to the safety seat, the prop assembly having a stowed position and a safely deployed position, the prop assembly including:
   a leg assembly;
   a foot assembly mounted to the leg assembly; and
   a first sensor for sensing when the prop assembly is not in the stowed position;
   a second sensor for sensing when the prop assembly is not in the safely deployed position;
   a visual warning indicator, the visual warning indicator visually obscured when the prop assembly is in the safely deployed position; and a warning system having a standby state, a timing state and a warning state, wherein the warning system changes from the standby state to the timing state when the first sensor senses that the prop assembly is not in its stowed position, and wherein the warning system changes from the timing state to the warning state, if the second sensor senses that the prop assembly is not in its safely deployed position by a pre-determined time after the change from the standby state to the timing state.

2. The assembly of claim 1 including a base for receiving the safety seat.

3. The assembly of claim 2 wherein the prop assembly is pivotably mounted to the base.

4. The assembly of claim 2 wherein the warning system includes a processor and a sound generator for generating an audible alarm sound, and wherein when the warning system changes from the timing state to the warning state, the sound generator is activated so as to generate an audible alarm sound.

5. The assembly of claim 1 wherein the prop assembly is pivotably mounted to the safety seat.

6. The assembly of claim 1 wherein the foot assembly includes a foot housing mounted to the leg assembly and a foot body moveably mounted with respect to the foot housing, the foot body having an extended position and a retracted position.

7. The assembly of claim 6 wherein the visual warning indicator is visually exposed when the foot body is in the extended position, thereby indicating that the prop assembly is not in the safely deployed position.

8. The assembly of claim 6 wherein the foot body is slideably mounted with respect to the foot housing.

9. The assembly of claim 8 wherein the visual warning indicator is located on a lower end of the leg assembly and the foot body includes a sleeve, the sleeve covering the visual warning indicator in its retracted position and exposing the visual warning indicator in its extended position.

10. The assembly of claim 6 wherein the foot body is biased toward its extended position.

11. The assembly of claim 10 wherein the foot body is biased toward its extended position by a pair of spaced apart compression springs.

12. The assembly of claim 6 wherein the foot body includes a foot base, the foot base arranged and constructed for engaging a vehicle floor.

13. The assembly of claim 1 wherein the first sensor is a tilt sensor mounted to the prop assembly.

14. The assembly of claim 13 wherein the tilt sensor is mounted in the foot housing.

15. The assembly of claim 1 wherein the tilt sensor senses the angle of the leg assembly with respect to vertical.

16. The assembly of claim 15 wherein the tilt sensor has a first switch condition and a second switch condition, the second switch condition activating when the tilt sensor senses that the angle of the leg assembly with respect to horizontal exceeds a pre-defined tilt angle.

17. The assembly of claim 16 wherein the tilt sensor has a first switch condition and a second switch condition, the second switch condition activating when the tilt sensor senses that leg assembly has moved away from the stowed position.

18. The assembly of claim 1 wherein the second sensor is a displacement sensor.

19. The assembly of claim 18 wherein the second sensor is mounted in the foot housing and is activated by movement of the foot body.

20. The assembly of claim 1 wherein the leg assembly includes:
- an upper leg portion;
- a lower leg portion, the lower leg portion telescopically moveable with respect to the upper leg portion; and
- a locking mechanism for locking the lower leg with respect to the upper leg portion at a plurality of user-selectable extension positions.

* * * * *